United States Patent [19]
Mitsumori et al.

[11] Patent Number: 5,888,357
[45] Date of Patent: *Mar. 30, 1999

[54] APPARATUS AND METHOD FOR PRODUCING IONIC WATER AND SYSTEM AND METHOD FOR PRODUCING ELECTROLYTIC IONIC WATER

[75] Inventors: Kenichi Mitsumori; Yasuhiko Kasama, both of Miyagi-ken; Koji Yamanaka; Takashi Imaoka, both of Saitama-ken; Tadahiro Ohmi, 2-1-17 Komegafukuro, Aoba-ku, Sendai, Miyagi-ken, all of Japan

[73] Assignees: Frontec Incorporated; Tadahiro Ohmi, both of Miyagi-ken; Organo Corporation, Tokyo, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 756,741
[22] Filed: Nov. 26, 1996

[30] Foreign Application Priority Data

Nov. 30, 1995 [JP] Japan .................................. 7-312365

[51] Int. Cl.⁶ .......................... C01B 53/00; C02F 1/461; B08B 6/00; B08B 5/04
[52] U.S. Cl. .................... 204/157.42; 205/742; 205/748; 205/755; 205/756; 134/1; 134/1.3; 134/21
[58] Field of Search .................... 204/157.15, 157.42; 205/742, 748, 770, 755, 756; 134/1, 1.3, 21

[56] References Cited

U.S. PATENT DOCUMENTS 4,533,451  8/1985  Kumazawa ............................... 204/229

FOREIGN PATENT DOCUMENTS 6-327749  11/1994  Japan .

OTHER PUBLICATIONS

Mead et al., "The Effect of Ultrasound on Water in the Presence of Dissolved Gases", Can. J. Chem., vol. 54, pp. 1114–1120, 1976.

*Primary Examiner*—Kathryn Gorgos
*Assistant Examiner*—Eana Wong
*Attorney, Agent, or Firm*—Brinks Hofer Gilson & Lione

[57] ABSTRACT

The present invention provides an apparatus and a method for producing ionic water which are capable of producing ionic water containing a low concentration of electrolyte with high reproducibility. The present invention also provides an apparatus and a method for producing electrolytic ionic water capable of producing electrolytic ionic water having stable characteristics. The ionic water producing apparatus has at least a gas-liquid mixing device for mixing raw water and a gas, and an ultrasonic exciting device for applying ultrasonic waves to the gas-liquid mixture obtained by the gas-liquid mixing device to generate ions.

9 Claims, 4 Drawing Sheets

5,888,357

APPARATUS AND METHOD FOR PRODUCING IONIC WATER AND SYSTEM AND METHOD FOR PRODUCING ELECTROLYTIC IONIC WATER

BACKGROUND OF THE INVENTION

1. Field of the Invention

The present invention relates to an apparatus and a method for producing ionic water, and a system and a method for producing electrolytic ionic water. Particularly, the present invention relates to a method and an apparatus for producing ionic water to be supplied to an apparatus for producing electrolytic ionic water used for cleaning a highly clean surface.

2. Description of the Related Art

Cleaning with electrolytic ionic water has recently been investigated for cleaning with higher cleanness. FIG. 4 shows an example of methods of producing electrolytic ionic water.

An electrolytic device 400 comprises an anode chamber 403 provided with an anode electrode 401, and a cathode chamber 404 provided with a cathode electrode 402, both chambers being separated by an ion exchange membrane 405. The electrolytic device 400 further comprises introduction pipe systems 406 and 407 for introducing raw water into the anode chamber 403 and the cathode chamber 404, respectively, and discharge pipe systems 408 and 409 for discharging electrolytic liquids from these chambers.

To the introduction pipe systems 406 and 407, respectively, electrolyte adding devices 410 and 411 are connected so as to continuously inject, for example, HCl, $NH_4OH$ or the like, into the raw water. When an electric current is supplied directly to the electrodes 401 and 402 to continuously produce electrolytic reaction, electrolytic anode water and electrolytic cathode water each having a desired pH can continuously be obtained.

Although an electrolyte is added for effectively performing electrolysis or controlling the pH, the system shown in FIG. 4 requires the addition of an electrolyte which is diluted to a necessary concentration, and thus has the problem of requiring much time and the problem of causing variations in water supply to the electrolytic device due to the pulsation of a pump, and thus variations in electrolytic conditions, thereby causing difficulties in producing stable electrolytic ionic water. This method is also difficult to precisely add a low concentration (100 ppm or less) of electrolyte with good reproducibility. There are also problems with the occurrence of a collection of high-concentration liquid and the control of particles and the like.

SUMMARY OF THE INVENTION

In consideration of the above present conditions, an object of the present invention is to provide an apparatus and a method for producing ionic water which can produce ionic water containing a low concentration of electrolyte with high reproducibility. Another object of the present invention is to provide an apparatus and a method for producing electrolytic ionic water which can obtain stable electrolytic ionic water.

In order to achieve the objects, the present invention provides an apparatus for producing ionic water comprising at least gas-liquid mixing means for mixing raw water and gases, and ultrasonic exciting means for applying ultrasonic waves to the gas-liquid mixture obtained from the gas-liquid mixing means to generate ions.

In the gas-liquid mixing means, the gases and the raw water are separated by a gas permeable film permeable to gases only so that the gases are passed through the film to the raw water side and mixed with the raw water.

The gases comprise $N_2$, $N_2$ and $H_2$, $N_2$ and $O_2$, or these gases diluted with argon (Ar), krypton (Kr) or xenon (Xe).

At least two gas-liquid mixing means are provided for respectively mixing a plurality of gases by the gas-liquid mixing means. One of the gas-liquid mixing means is adapted for mixing any one of Ar, Kr and Xe with the raw water.

The present invention also provides a method of producing ionic water comprising dissolving gases in raw water, applying ultrasonic waves to the raw water to generate ions by reaction of the gases.

The gases comprise $N_2$, $N_2$ and $H_2$, or $N_2$ and $O_2$ gases. At least one of Ar, Kr and Xe is preferably dissolved in the raw water.

The concentration of the ions is changed by controlling the frequency and/or output of the ultrasonic waves.

The present invention further provides a method of producing electrolytic ionic water comprising producing electrolytic ionic water by electrolyzing the ionic water produced by the ionic water producing method.

The present invention still further provides a system for producing electrolytic ionic water comprising the ionic water producing apparatus provided on the electrolyte supply side of an electrolytic device.

DESCRIPTION OF THE PREFERRED EMBODIMENTS

An apparatus for producing ionic water and a system for producing electrolytic ionic water of the present invention are described with reference to FIG. 1.

Figure 1:
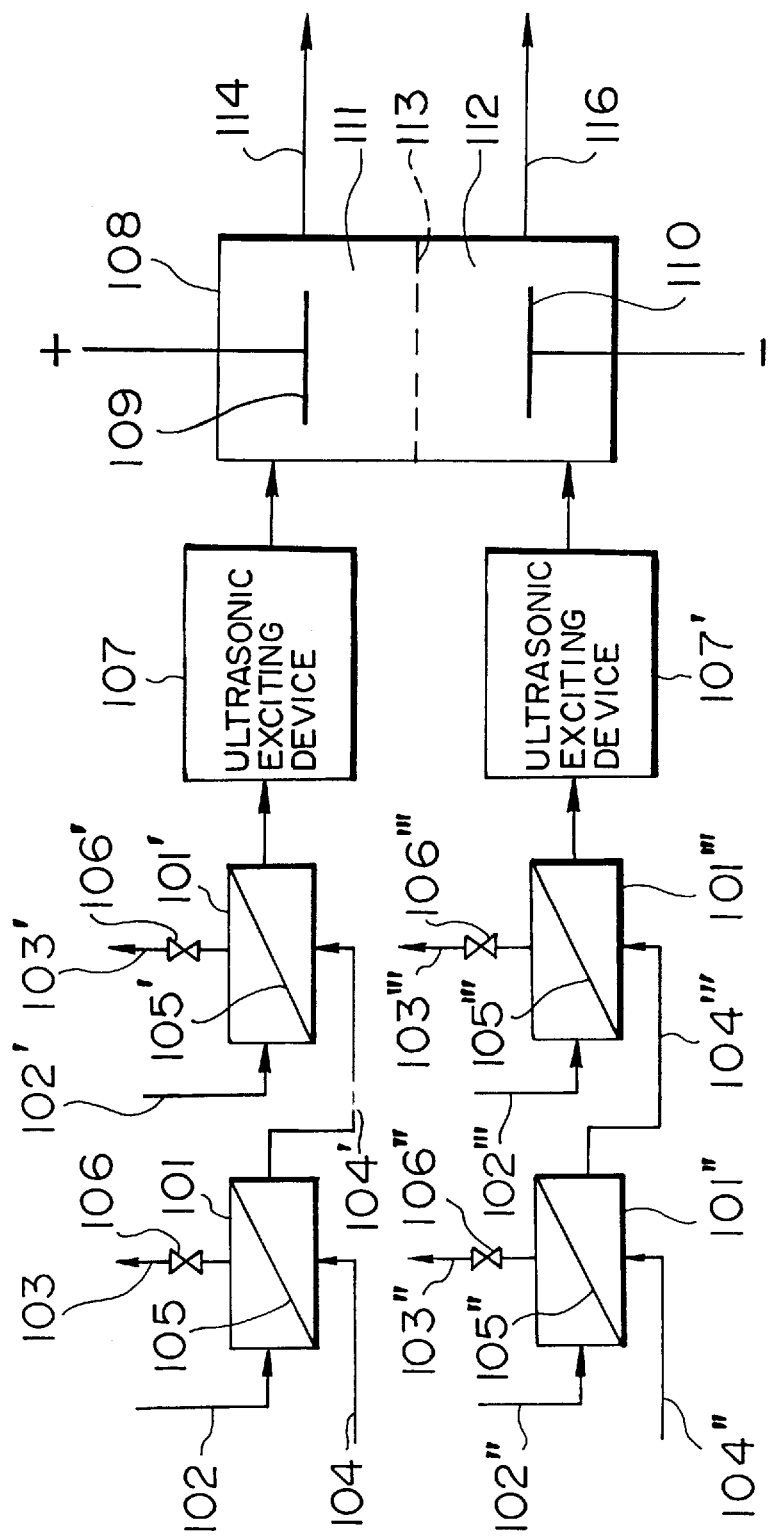
FIG. 1 is a conceptual drawing illustrating a system for producing electrolytic ionic water in accordance with an embodiment of the present invention.

In FIG. 1, reference numerals 101, 101', 101" and 101''' each denote gas-liquid mixing means for mixing a gas and raw water. Reference numerals 102, 102', 102" and 102''' each denote a gas inlet pipe; reference numerals 103, 103', 103" and 103''' each denote a gas discharge pipe; reference numerals 104, 104', 104" and 104''' each denote a raw water introduction pipe; reference numerals 105, 105', 105" and 105''' each denote a permeable film permeating only gases; reference numerals 106, 106', 106", and 106''' denote values, and reference numerals 107 and 107' each denote an ultrasonic exciting device for applying ultrasonic waves to a gas-liquid mixture, which has a closed structure so as to prevent contact between the gas-liquid mixture and air.

The interior of an electrolytic device 108 is divided, by an ion exchange membrane 113, into an anode chamber 111 provided with an anode electrode 109, and a cathode chamber 112 provided with a cathode electrode 110. The ionic water discharged from the ultrasonic exciting devices 107 and 107' is introduced into the anode chamber 111 and the cathode chamber 112, respectively and electrolyzed by applying a DC voltage between the electrodes 109 and 110.

The electrolytic ionic water subjected to electrolysis is sent to each use point through an anode ionic water discharge pipe 114 and a cathode ionic water discharge pipe 115, and used for cleaning a substrate.

Description will now be made of the methods of producing ionic water and electrolytic ionic water by using the apparatus shown in FIG. 1.

To the gas-liquid mixing means 101, mixed gases of $N_2$ gas and $O_2$ gas (for example, 2:3) are sent from the gas inlet pipe 102 under a pressure of 0.5 atm, and deaerated pure water is supplied through the raw water supply pipe 104 at a rate of 1 l/min. As a result, the $N_2$ gas and $O_2$ gas are passed through the gas permeable film 105 and dissolved in the pure water in amounts of about 4 mg/l and 13 mg/l, respectively.

The pure water in which the $N_2$ and $O_2$ gases are dissolved is sent to the gas-liquid mixing means 101' in the next step for dissolving about 6 mg/l of Ar gas under 0.1 atm by the same method as described above.

In the ultrasonic exciting device 107, ultrasonic waves are applied to the raw water in which the $N_2$, $O_2$ and Ar gases are dissolved, to generate about 16 mg/l of $NO_3-$ ions by reaction of the dissolved $N_2$ and $O_2$. The frequency of the ultrasonic waves applied is preferably 10 kHz to 3 MHz, and the concentration of the generated $NO_3-$ ions can be controlled by controlling the frequency or output of the ultrasonic waves. Namely, the concentrations of various ions can precisely be set with good reproducibility by applying ultrasonic waves with appropriate frequencies and output.

Mixing of Ar gas enables the efficient formation of ions in the pure water. Although reasons for this are not yet apparent, this is possibly due to the fact that the presence of Ar in water accelerates the formation of OH radicals when ultrasonic waves are applied, and causes a catalytic function for the reaction of $N_2$ and $O_2$. The same effect is confirmed by the Kr and Xe gases.

The ionic water containing $NO_3-$ is sent to the anode chamber 111.

On the other hand, the ionic water to be sent to the cathode chamber 112 is processed in the same manner as described above. Namely, $N_2$ and $H_2$ gases (for example, 1:3) are dissolved in pure water by the gas-liquid mixing means 101'' in the first step, and Ar gas is dissolved in the pure water by the gas-liquid mixing means 101''' in the next step. In the ultrasonic exciting device 107', the, $N_2$ and $H_2$ gases are reacted to generate $NH_4+$. The concentration of the generated ions can be changed by controlling the frequency and/or output of the ultrasonic waves, as described above.

The ionic water introduced into the anode chamber 111 and the cathode chamber 112 is electrolyzed by applying a predetermined voltage between the electrodes (at an electrode distance of 20 mm and about 0 to 10 V) to produce electrolytic anode water and electrolytic cathode water each having a desired pH.

Since the ion concentration of the supplied ionic water is precisely controlled, the characteristics of the electrolytic ionic water produced as described above, such as the pH, specific resistance, oxidation-reduction potential, etc., are significantly stabilized.

In the embodiment shown in FIG. 1, in the process for producing the ionic water to be supplied to the anode chamber 111, mixed gases of $N_2$ and $O_2$ are introduced into the gas-liquid mixing means 101 in the first step, and Ar gas is introduced into the gas-liquid mixing means 101' in the next step. However, one-step gas-liquid mixing means may be provided so that mixed gases of $N_2$, $O_2$ and Ar gases are introduced therein. This also is true of the cathode side.

Figure 2:
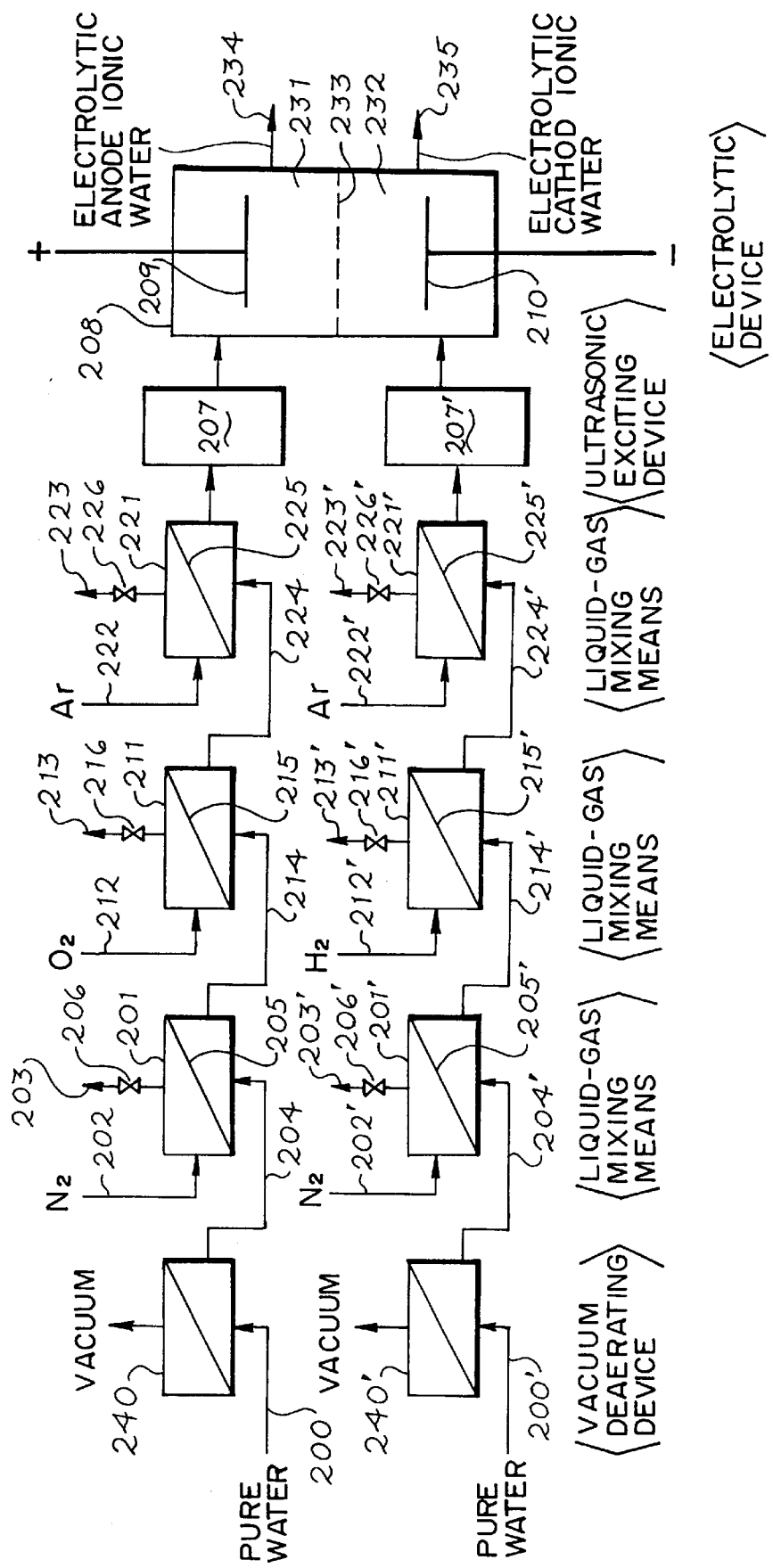
FIG. 2 is a conceptual drawing illustrating a system for producing electrolytic ionic water in accordance with another embodiment of the present invention.

As shown in FIG. 2, gases to be dissolved in pure water may be respectively introduced into gas-liquid mixing means and dissolved in the pure water.

Reference numerals 201, 201', 211, 211', 221, and 221' each denote a gas-liquid mixing means. Reference numerals 202, 202', 212, 212', 222, and 222' each denote a gas inlet pipe. Reference numerals 203, 203', 213, 213', 223, and 223' each denote a gas outlet pipe. Reference numerals 200, 200', 204, 204', 214, 214', 224, and 224' each denote a water inlet pipe. Reference numerals 205, 205', 215, 215', 225, and 225' each denote a permeable film. Reference numerals 206, 206', 216, 216', 226, and 226' each denote a valve. Reference numerals 207 and 207' each denote an ultrasonic exciting device. Reference numeral 209 denotes an anode electrode. Reference numeral 210 denotes a cathode electrode. Reference numerals 231 and 232 denote an anode and a cathode chamber, respectively. Reference numeral 233 denotes an ion exchanging film. Reference numerals 234 and 235 denote anode and cathode ionic water discharge pipes, respectively. Reference numerals 240 and 240' each denote a vacuum deaerating device.

$N_2$ or $N_2$ and $O_2$ gases are used on the anode side, and $N_2$ and $H_2$ gases are used on the cathode side. Although the effect of the present invention can be obtained without using Ar, Kr or Xe gas, it is preferable to dissolve such a gas in raw water because such a gas has a catalytic function.

Although gas pressure is appropriately determined by the concentration of a gas to be dissolved in raw water, the pressure is about $1 \times 10^4$ to $6 \times 10^5$ Pa.

The ratio of the gases dissolved is preferably the stoichiometric ratio necessary for forming desired ions.

Although, in the embodiment shown in FIG. 1, the gas-liquid mixing means comprises the gas permeable film, the gas permeable film may be in any one of forms such as a flat plate, a hollow yarn and the like. Methods other than the method using the permeable film may be employed in which gases are dissolved by bubbling or using an ejector.

The ion concentration of ionic water to be supplied to the electrolytic device is preferably about 1 to 400 mg/l and 1 to 40 mg/l on the cathode side and the anode side, respectively. When the resulting cathode water or anode water having an ion concentration within this range is used for cleaning a member such as a semiconductor element, the property of removing pollutants from the surface of the member (the property of removing metals, the property of removing particles and the property of removing organic materials) becomes more excellent.

The ion concentration changes with the concentrations of the gases dissolved, i.e., the gas pressure in the gas-liquid mixing mechanism, the output and frequency of the ultrasonic waves applied from the ultrasonic exciting device, etc.

The present invention is described in detail below with reference to embodiments.

Embodiment 1

Ionic water was produced by using the apparatus shown in FIG. 2 in which $N_2$, $O_2$ and Ar gases and $N_2$, $H_2$ and Ar gases were dissolved in pure water on the anode side and the cathode side, respectively, and ultrasonic waves were then applied to the water.

Figure 3A:
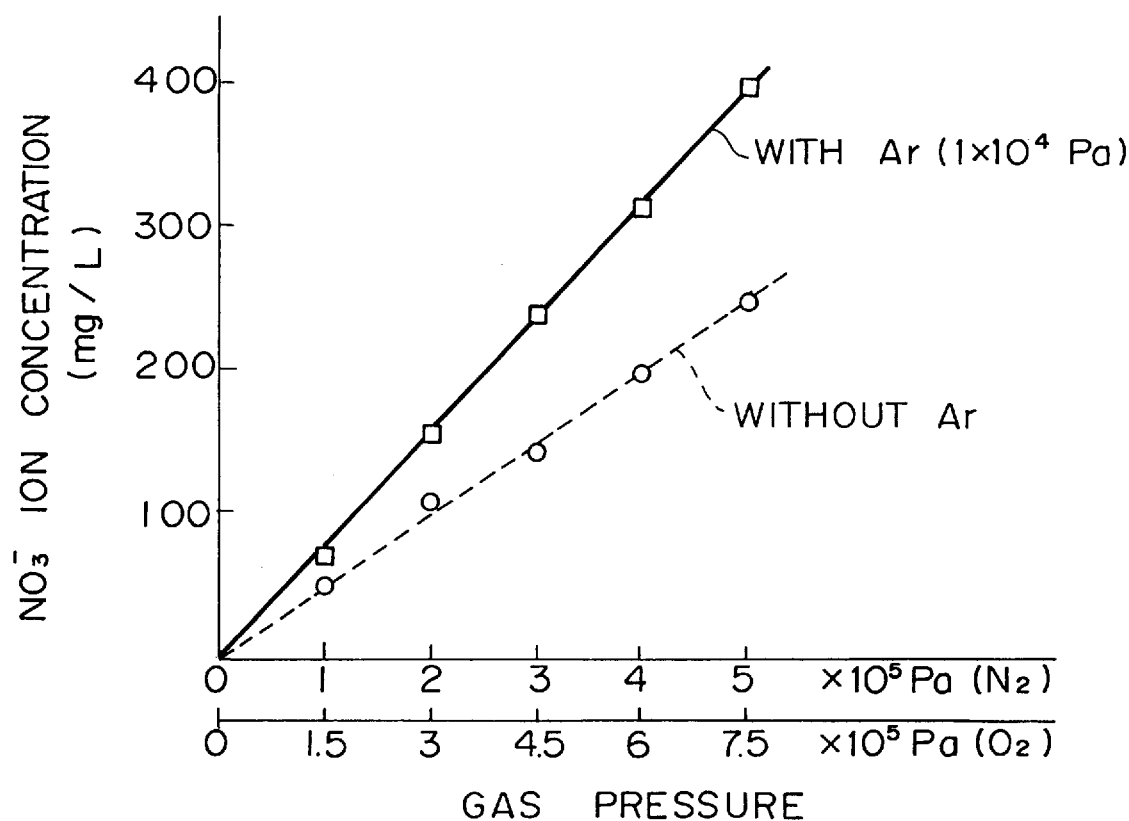
FIGS. 3A and 3B are graphs showing the relation between the ion concentration and gas pressure at the outlet of each of ultrasonic exciting devices.
Figure 3B:
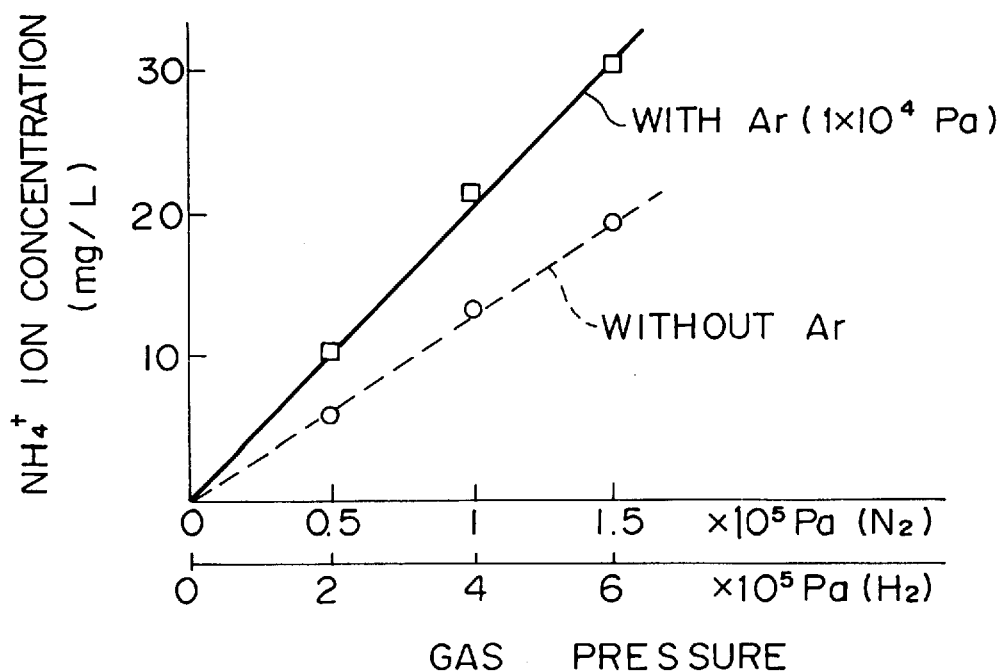
Figure 4:
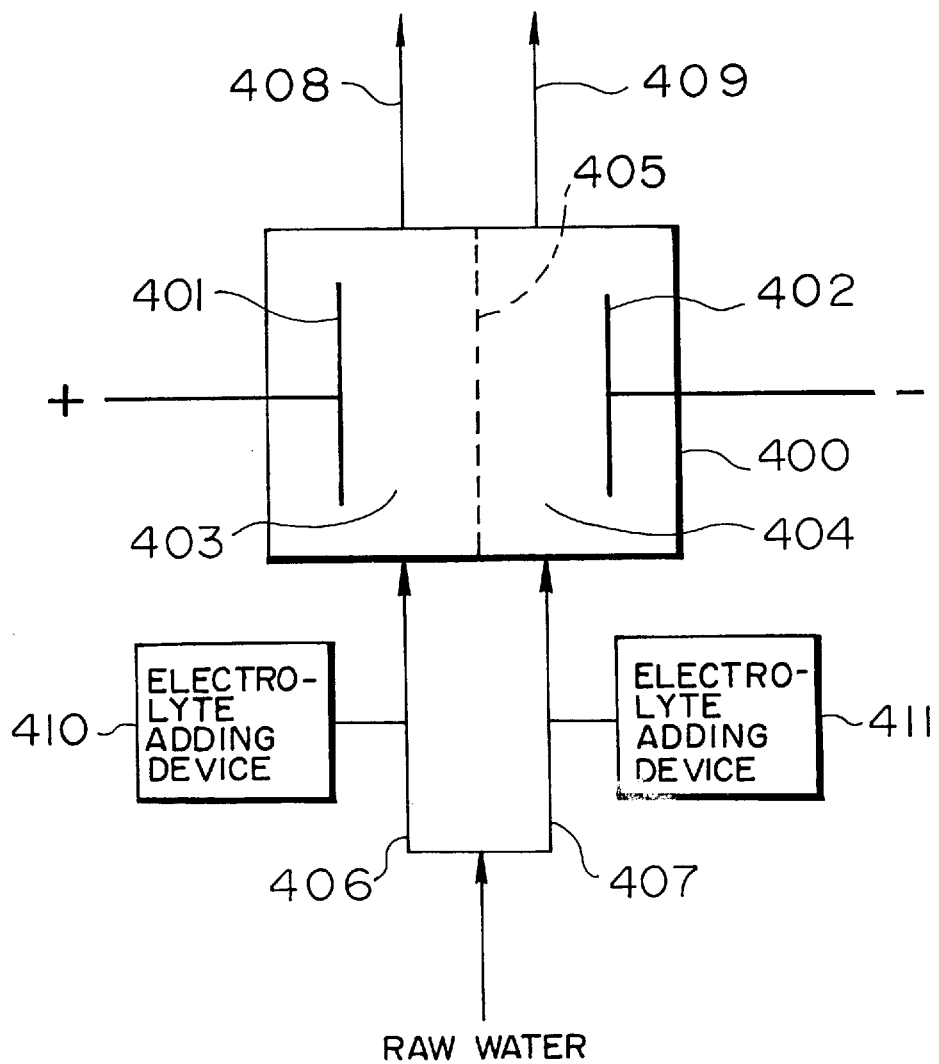
FIG. 4 is a conceptual drawing illustrating a conventional system for producing electrolytic ionic water.

FIG. 3 show the relations between the ion concentrations ($NO_3-$, $NH_4+$) of the thus-produced ionic water and the pressure of each of the gases. On either the anode side or the cathode side, the temperature and flow rate of the pure water were 20° C. and 1 l/min, respectively, the ultrasonic exciting device used had a bath volume of 11 l, and the frequency and output were 0.95 MHz and 1200 W, respectively.

FIG. 3 indicates that the ion concentration can be controlled by controlling the gas pressure, and that ions can efficiently be produced by dissolving Ar gas.

Even in 10 repetitions, the results of ion concentrations shown in FIG. 3 were within the range of ±5%, thereby exhibiting high reproducibility.

Embodiment 2

Ionic water was produced under the same conditions as Embodiment 1 except that the pressures of $N_2$, $O_2$ and Ar gases on the anode side were $1 \times 10^5$, $1.5 \times 10^5$ and $1 \times 10^4$ Pa, respectively, and the pressures of $N_2$, $H_2$ and Ar gases on the cathode side were $0.5 \times 10^5$, $2 \times 10^5$ and $1 \times 10^4$ Pa, respectively. The thus-produced ionic water was sent to the anode chamber and the cathode chamber, and electrolyzed under the conditions shown in Table 1 to produce electrolytic anode water and electrolytic cathode water, respectively. Table 1 also shows the characteristics of the produced ionic water.

TABLE 1

| | |
|---|---|
| Flow rate in the anode chamber | 1 l/min. |
| Flow rate in the cathode chamber | 1 l/min. |
| $NO_3-$ concentration at the inlet of the anode chamber | 70 mg/l |
| $NH_4+$ concentration at the inlet of the cathode chamber | 10 mg/l |
| Current density | 6 A/dm$^2$ |
| Characteristics of anode water | oxidation/reduction potential = 1400 mV (vs NHE), pH = 3.1 |
| Characteristics of cathode water | oxidation/reduction potential = −550 mV (vs NHE), pH = 10.1 |

The apparatus and method for producing ionic water of the present invention are capable of precisely controlling even a low ion concentration and easily producing ionic water with high reproducibility.

A combination of the apparatus for producing ionic water and the electrolytic device enables the production of electrolytic ionic water having stable characteristics.

What is claimed is:

1. A method of producing ionic water comprising:
   dissolving at least one gas in raw water;
   applying ultrasonic waves to the raw water to generate ions by reaction with the at least one gas, and
   wherein a concentration of an ion is changed by controlling at least one of a frequency and an output power of the ultrasonic waves.

2. A method of producing electrolytic ionic water comprising the steps of:
   dissolving $N_2$ gas and $H_2$ gas in pure water;
   applying ultrasonic waves to the pure water to produce ionic water containing $NH_4^+$ ions; and
   electrolyzing the ionic water to produce electrolytic cathode water.

3. A method of producing electrolytic ionic water according to claim 2, wherein the method further comprises the step of dissolving at least one selected from group consisting of argon, krypton, and xenon in the pure water.

4. A method of producing electrolytic ionic water comprising the steps of:
   dissolving $N_2$ gas and $H_2$ gas in pure water in a first gas-liquid mixing means;
   dissolving at least one gas selected from the group consisting of argon, krypton, and xenon in the pure water in a second gas-liquid mixing means, the second gas-liquid mixing means being located downstream of the first gas-liquid mixing means;
   applying ultrasonic waves to the pure water in which the $N_2$ gas, the $H_2$ gas, and the at least one gas selected from the group consisting of argon, krypton, and xenon are dissolved, wherein the ultrasonic waves are applied by a first ultrasonic exciting device located downstream of the second gas-liquid mixing means; and
   electrolyzing the pure water in which the $N_2$ gas, the $H_2$ gas, and the at least one gas selected from the group consisting of argon, krypton, and xenon are dissolved in an electrolyzing device to produce electrolytic cathode water, the electrolyzing device being located downstream of the first ultrasonic exiting device.

5. A method of producing electrolytic ionic water according to claim 4, wherein the method further comprises the steps of:
   dissolving $N_2$ gas and $O_2$ gas in pure water in a third gas-liquid mixing means;
   dissolving at least one gas selected from the group consisting of argon, krypton, and xenon in the pure water in a fourth gas-liquid mixing means, the fourth gas-liquid mixing means being located downstream of the third gas-liquid mixing means;
   applying ultrasonic waves to the pure water in which the $N_2$ gas, the $O_2$ gas, and the at least one gas selected from the group consisting of argon, krypton, and xenon are dissolved, wherein the ultrasonic waves are applied by a second ultrasonic exciting device located downstream of the fourth gas-liquid mixing means; and
   electrolyzing the pure water in which the $N_2$ gas, the $O_2$ gas, and the at least one gas selected from the group consisting of argon, krypton, and xenon are dissolved in an electrolyzing device to produce electrolytic anode water, the electrolyzing device being located downstream of the second ultrasonic exiting device.

6. A method of producing electrolytic ionic water comprising the steps of:
   dissolving $N_2$ gas in pure water in a first gas-liquid mixing means;
   dissolving $H_2$ gas in the pure water in a second gas-liquid mixing means, the second gas-liquid mixing means being located downstream from the first gas-liquid mixing means;
   dissolving at least one gas selected from the group consisting of argon, krypton, and xenon in the pure water in a third gas-liquid mixing means, the third gas-liquid mixing means being located downstream of the second gas-liquid mixing means;
   applying ultrasonic waves to the pure water in which the $N_2$ gas, the $H_2$ gas, and the at least one gas selected from the group consisting of argon, krypton, and xenon are dissolved, wherein the ultrasonic waves are applied by a first ultrasonic exciting device located downstream of the third gas-liquid mixing means; and
   electrolyzing the pure water in which the $N_2$ gas, the $H_2$ gas, and the at least one gas selected from the group consisting of argon, krypton, and xenon are dissolved in an electrolyzing device to produce electrolytic cathode water, the electrolyzing device being located downstream of the first ultrasonic exiting device.

7. A method of producing electrolytic ionic water according to claim 6, wherein the method further comprises the steps of:

dissolving $N_2$ gas in pure water in a fourth gas-liquid mixing means;

dissolving $O_2$ gas in the pure water in a fifth gas-liquid mixing means, the fifth gas-liquid mixing means being located downstream from the fourth gas-liquid mixing means;

dissolving at least one gas selected from the group consisting of argon, krypton, and xenon in the pure water in a sixth gas-liquid mixing means, the sixth gas-liquid mixing means being located downstream of the fifth gas-liquid mixing means;

applying ultrasonic waves to the pure water in which the $N_2$ gas, the $O_2$ gas, and the at least one gas selected from the group consisting of argon, krypton, and xenon are dissolved, wherein the ultrasonic waves are applied by a second ultrasonic exciting device located downstream of the sixth gas-liquid mixing means; and electrolyzing the pure water in which the $N_2$ gas, the $O_2$ gas, and the at least one gas selected from the group consisting of argon, krypton, and xenon are dissolved in an electrolyzing device to produce electrolytic anode water, the electrolyzing device being located downstream of the second ultrasonic exiting device.

8. A method of producing electrolytic ionic water comprising the steps of:

dissolving $N_2$ gas, $H_2$ gas, and at least one gas selected from the group consisting of argon, krypton, and xenon in pure water in a first gas-liquid mixing means;

applying ultrasonic waves to the pure water in which the $N_2$ gas, the $H_2$ gas, and the at least one gas selected from the group consisting of argon, krypton, and xenon are dissolved, wherein the ultrasonic waves are applied by a first ultrasonic exciting device located downstream of the first gas-liquid mixing means; and electrolyzing the pure water in which the $N_2$ gas, the $H_2$ gas, and the at least one gas selected from the group consisting of argon, krypton, and xenon are dissolved in an electrolyzing device to produce electrolytic cathode water, the first electrolyzing device being located downstream of the first ultrasonic exiting device.

9. A method of producing electrolytic ionic water according to claim 8, wherein the method further comprises the steps of:

dissolving $N_2$ gas, $O_2$ gas, and at least one gas selected from the group consisting of argon, krypton, and xenon in pure water in a second gas-liquid mixing means;

applying ultrasonic waves to the pure water in which the $N_2$ gas, the $O_2$ gas, and the at least one gas selected from the group consisting of argon, krypton, and xenon are dissolved, wherein the ultrasonic waves are applied by a second ultrasonic exciting device located downstream of the second gas-liquid mixing means; and electrolyzing the pure water in which the $N_2$ gas, the $O_2$ gas, and the at least one gas selected from the group consisting of argon, krypton, and xenon are dissolved in an electrolyzing device to produce electrolytic anode water, the electrolyzing device being located downstream of the second ultrasonic exiting device.

* * * * *

UNITED STATES PATENT AND TRADEMARK OFFICE
CERTIFICATE OF CORRECTION

PATENT NO. :   5,888,357
DATED      :   March 30, 1999
INVENTOR(S) :  Kenichi Mitsumori et al.

It is certified that error appears in the above-indentified patent and that said Letters Patent is hereby corrected as shown below:

```
In claim 4, line 21, replace "exiting" with --exciting--.

In claim 5, line 22, replace "exiting" with --exciting--.

In claim 6, line 25, replace "exiting" with --exciting--.

In claim 7, line 26, replace "exiting" with --exciting--.

In claim 8, line 17, replace "exiting" with --exciting--.

In claim 9, line 18, replace "exiting" with --exciting--.
```

Signed and Sealed this

Sixteenth Day of November, 1999

Attest:

Q. TODD DICKINSON

*Attesting Officer*   *Acting Commissioner of Patents and Trademarks*